United States Patent
Terradas et al.

(10) Patent No.: US 7,458,293 B2
(45) Date of Patent: Dec. 2, 2008

(54) PEDAL SECURITY SYSTEM

(75) Inventors: Jaume Prat Terradas, Barcelona (ES); David A. Gras, Sant Cugat del Valles (ES)

(73) Assignee: FICO Cables, S.A., Barcelona (ES)

( * ) Notice: Subject to any disclaimer, the term of this patent is extended or adjusted under 35 U.S.C. 154(b) by 238 days.

(21) Appl. No.: 10/510,423

(22) PCT Filed: May 19, 2003

(86) PCT No.: PCT/EP03/05248

§ 371 (c)(1), (2), (4) Date: Apr. 21, 2005

(87) PCT Pub. No.: WO03/097414

PCT Pub. Date: Nov. 27, 2003

(65) Prior Publication Data

US 2005/0172684 A1 Aug. 11, 2005

(30) Foreign Application Priority Data

May 17, 2002 (DE) ................. 102 22 106

(51) Int. Cl.
G05G 1/14 (2006.01)
B60T 7/12 (2006.01)
B60T 7/22 (2006.01)
B60K 28/10 (2006.01)

(52) U.S. Cl. ............... 74/512; 74/513; 74/560; 180/274

(58) Field of Classification Search ........... 74/512, 74/513, 560; 180/274; 280/748, 784, 779
See application file for complete search history.

(56) References Cited

U.S. PATENT DOCUMENTS

| 5,983,746 | A | 11/1999 | Nawata et al. |
| 5,996,440 | A | 12/1999 | Nawata et al. |
| 6,101,894 | A | 8/2000 | Tiemann et al. |
| 6,112,616 | A | 9/2000 | Schonlau et al. |
| 6,786,109 | B2 * | 9/2004 | Mueller et al. ................. 74/512 |
| 6,840,131 | B2 * | 1/2005 | Matsumoto et al. ........... 74/512 |
| 7,111,703 | B2 * | 9/2006 | Endo et al. .................. 180/274 |
| 2002/0007693 | A1 | 1/2002 | Mueller et al. |

FOREIGN PATENT DOCUMENTS

| DE | 4409324 | 10/1994 |
| DE | 196 06 427 | 8/1997 |
| DE | 19733512 | 2/1999 |

(Continued)

OTHER PUBLICATIONS

International Search Report for International Patent Application No. PCT/EP03/05248, dated Oct. 17, 2003, 4 pages.

*Primary Examiner*—Vinh T. Luong
(74) *Attorney, Agent, or Firm*—Marshall, Gerstein & Borun LLP

(57) ABSTRACT

A pedal security system for pedal mounting, particularly for motor vehicles, includes a pedal rotatably mounted on a pedal axis, an opening for receiving and retaining the pedal axis which is connected with an expandable slot wherein the expandable slot receives the pedal axis by exceeding a mechanical limit load of the pedal axis.

5 Claims, 2 Drawing Sheets

FOREIGN PATENT DOCUMENTS

Figure 1:
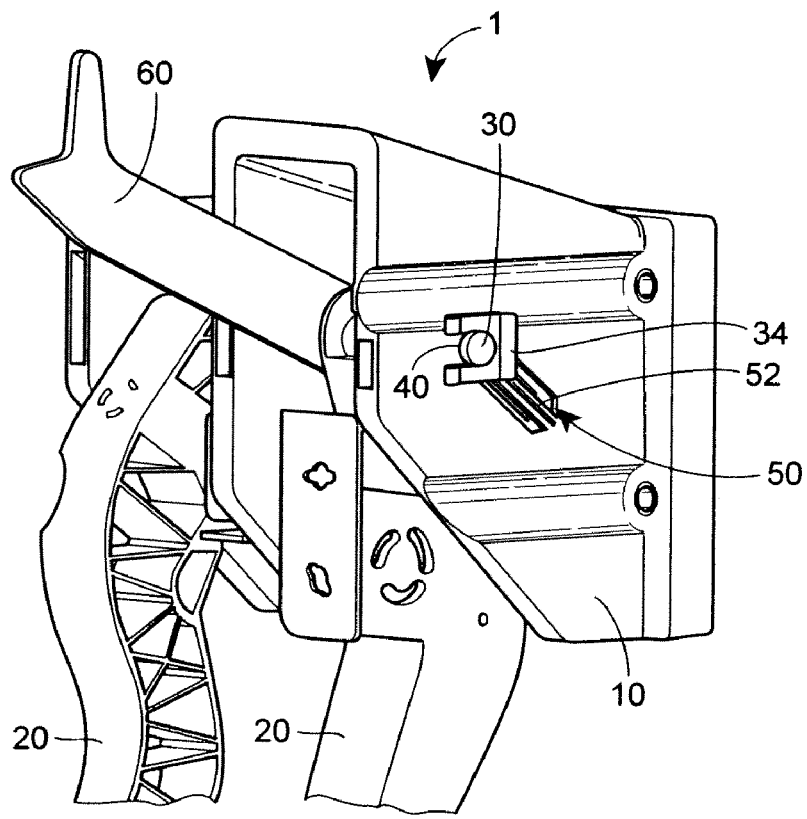

| | | |
|---|---|---|
| DE | 100 17 794 | 10/2001 |
| EP | 0997361 | 7/2002 |
| WO | WO 03/045750 | 6/2003 |
| WO | WO 2004/048169 A1 * | 6/2004 |
| WO | WO 2004/049091 A1 * | 6/2004 |

* cited by examiner

PEDAL SECURITY SYSTEM

CROSS-REFERENCE TO RELATED APPLICATION

This is the U.S. National Phase of International Application No. PCT/EP03/05248 filed 19 May 2003, the entire disclosure of which is incorporated herein by reference.

1. Field of the Invention

The present invention relates to a pedal security system, particularly for motor vehicles which minimizes the risk of injury of the driver in case of an accident.

2. Prior Art

In case of a frontal collision of a motor vehicle, the present pedals are for example pushed in the direction of the driver. This is mostly caused by the connection of the pedal via a linkage with for example the clutch or the brake system of the motor vehicle. In case the motor or parts of the vehicle structure are pushed in the direction of the driver during an accident, it is also possible that the pedals are moved in the direction of the driver via the movement of the connecting linkage. This generates substantial injury of the driver which is to be prevented by means of a pedal security system. It is thus a permanent interest of the automobile industry to increase the security of the passengers in motor vehicles, particularly of the driver.

The prior art provides different pedal security systems. These are mostly expensive lever constructions which move the pedal away from the driver in case of an accident based on the movement or deformation of the vehicle structure. It is a further technical alternative to blockade the pedal so that it cannot be moved in the direction of the driver. The pedal security system of the DE 196 06 427 discloses a pedal mounting which releases the pedal axis in case of an accident. To this end, the pedal axis is mounted in a construction which displaces in case of an accident so that the opening for mounting the pedal axis releases the same downwardly. Then, the pedal can no longer be rotated in the direction of the driver by means of the connected linkage via the pedal axis and thus cause injuries. This assembly is, however, connected to different disadvantages. On the one hand, this pedal security system is provided by an expensive technical construction which is connected to high production and maintenance costs. It is a further disadvantageous that the pedal is freely moveable in the passenger compartment after release of the pedal axis. This uncontrolled free movement can also lead to serious injuries of the driver.

A further pedal security system is disclosed by the DE 100 17 794. This pedal security system is made of a bearing brush for the pedal axis comprising a predetermined braking point. In case of an accident, the pedal axis is mechanically loaded by the connection for instance with the vehicle structure. This mechanical loading leads to a failure of the bearing brush for the pedal axis based on the presence of said predetermined braking point. As soon as the bearing brush fails, the pedal axis as well as the whole pedal is released. Now, the pedal is only connected with the linkage, for example of the clutch or the brake system. As already mentioned above in connection with the other pedal security system, the pedal is now freely moveable and can also lead to injuries of the driver. It is also disadvantageous that the bearing brush for mounting the pedal axis is destroyed into pieces in case of an accident which also can lead to injuries of the passengers.

It is therefore the problem of the present invention to provide a pedal security system which further reduces the risk of injury of the driver compared to the prior art and which additionally is realized by a cheap technical construction in view of manufacture and maintenance.

SUMMARY OF THE INVENTION

The above problem is solved by a pedal security system according to the present invention. This pedal security system comprises a pedal rotatably mounted by means of a pedal axis, an opening for receiving and retaining said pedal axis in connection with an expandable slot wherein said expandable slot receives said pedal axis by exceeding a mechanical limit load of the pedal axis.

The pedal security system according to this disclosure selectively moves the pedal out of the area of the driver without completely releasing the same from its mounting. To this end, the present invention comprises an arrangement retaining said pedal axis which rotatably fixes the pedal axis under normal conditions and which in case of an accident provides a defined displacement path for the pedal axis and thus for the pedal. This defined path is predetermined by an expandable slot which expands by exceeding a mechanical limit load and, thus, can receive said pedal axis. This pedal axis also providing the rotating axis of said pedal is in this manner selectively moved out of the region of the driver and it is simultaneously hold fast or secured to not cause injuries by the free movability of the pedal. Dependent on the construction of the respective motor vehicle, defined paths or desirable course for displacing the pedal axis can be predetermined by means of said expandable slot. In this manner, the pedal security system of the present invention can be optimally adapted to the local requirements of all motor vehicles.

According to a first preferred embodiment of the present invention, the pedal security system comprises a pushing element. This pushing element cooperates with the pedal axis in such a way that it pushes the pedal axis into said expandable slot.

Preferably according to the invention, a mechanical connection exists between the pedal axis and parts of the motor vehicle which are deformed in case of an accident. By means of this deformation, a displacement or movement is transmitted to the pedal axis so that the same is released from its opening. To this end, the pushing element provides a simple construction which transmits the mechanical displacements or forces in case of an accident.

According to a further preferred embodiment of the present invention, said expandable slot predetermines a displacement path of the pedal axis. It is also preferred according to the invention to form said expandable slot by an elongated hole which is partly closed by moveable lateral walls projecting there into.

As already mentioned, said expandable slot is connected to said opening accommodating and retaining said pedal axis. In its basic shape, said expandable slot is formed by an elongated hole. Along the longer sides of said elongated hole, lateral walls are configured which project into said elongated hole and which in this manner at least partly close said expandable slot. It is prevented by said projecting lateral walls that said pedal axis slides out of said opening directly in said expandable slot under normal conditions, i.e. without an accident of the motor vehicle. These lateral walls are further moveably arranged. This means that they can be moved out of said elongated hole for example by the action of a sufficient high mechanical loading so that said expandable slot forms a sufficient big elongated opening for receiving said pedal axis.

According to a further preferred embodiment of the present invention, said moveable lateral walls can be bent away, brake away or pushed away based on the mechanical loading by said pedal axis.

Preferably according to the invention, in case of an accident said mechanical loading is directly or indirectly transmitted to said pedal axis in form of a displacement or a force. In turn, said pedal axis transmits this mechanical loading to said moveable lateral walls closing said expandable slot. In case the mechanical loading is sufficiently high, the moveable lateral walls do not resist said mechanical loading any longer and release said expandable slot. This means they are pushed out of said expandable slot by the pushing of the pedal axis so that an elongated hole is formed having similar cross-section as the opening for receiving said pedal axis. Said pedal axis then slides along said path which is predetermined by said expandable slot or said elongated hole. The moving of said lateral walls of the expandable slot can preferably according to the invention be realized in different ways dependent on the used material. For example in case a plastic material is used for the lateral walls, they sidewardly break away due to a sufficiently high loading. It is also preferred according to the invention to make these lateral walls of plastic materials or metals which are outwardly bent away by the loading of the pedal axis. In this case, the lateral walls maintain mounted and an injury of the passengers of the motor vehicle by flying parts is prevented.

According to a further preferred embodiment of the present invention, said moveable lateral walls are pushed away by said pedal axis against the load of a spring.

Preferably according to the invention, said lateral walls are mounted as displaceable constructions near said elongated hole. These lateral walls are pushed into the inside of said elongated hole by means of springs so that they close the same. In case the mechanical loading by the pedal axis is sufficiently high, said lateral walls are pushed outwardly without destroying said expandable slot or said lateral walls and their mechanical connection.

According to a further preferred embodiment of the present invention, said opening for receiving said pedal axis and said expandable slot are arranged in a pedal block.

BRIEF DESCRIPTION OF THE ACCOMPANYING DRAWINGS

Figure 2A:
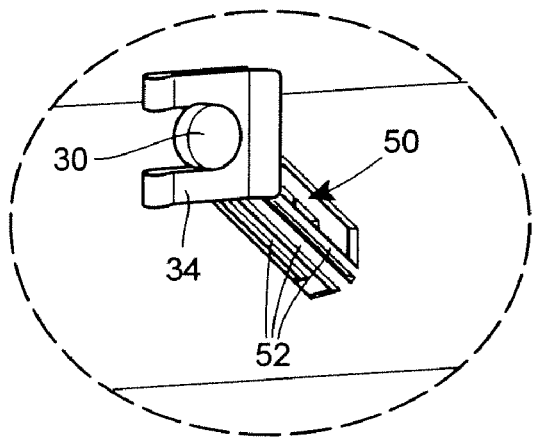
Figure 2B:
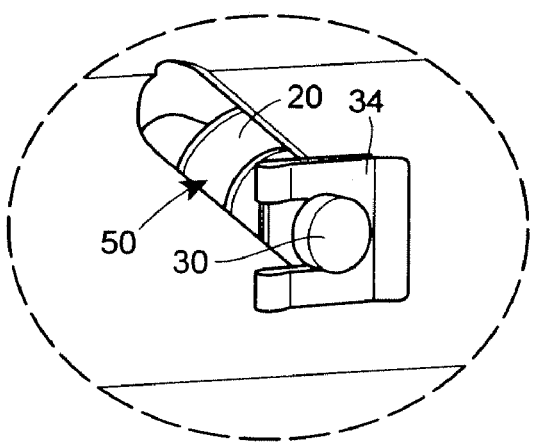

The present invention is described under reference to the accompanying drawing. It shows:

FIG. 1 a pedal module having a pedal security system according to a preferred embodiment of the present invention;

FIG. 2 said expandable slot according to a preferred embodiment in the two states A, B; and FIG. 3 the expandable slot in two preferred configurations according to the invention.

DETAILED DESCRIPTION OF THE INVENTION

The present invention relates to a pedal security system particularly used in connection with pedal modules 1 in motor vehicles.

It is generally known that motor vehicles are assembled in modular construction. Correspondingly, a pedal module 1 describes a component on which for example three pedals, the gas pedal, the clutch pedal and the brake pedal, are mounted. The whole pedal module 1 is then as one part installed in a motor vehicle and connected to the corresponding systems.

An overview of a preferred embodiment of the pedal module 1 according to the present invention is shown in FIG. 1.

Said pedal module 1 comprises a module block 10 serving for mounting said pedal module 1 in the motor vehicles. Furthermore, said module block 10 serves for receiving and mounting the pedal 20. Dependent on the vehicle type, said pedal module 1 can comprise different number of pedals 20. According to the illustration in FIG. 1, the preferred embodiment of the present pedal module 1 comprises two different pedals 20 mounted in said module block 10.

Said pedals 20 mounted in said pedal module 1 can on the one hand be connected to electronic or on the other hand to mechanical actuating units. Just in case of the use of mechanical actuating units, an increased risk of injury for the driver exists in case of an accident since these actuating units move the pedals in the region of the driver. To minimize the risk of injury of the driver, the present invention provides a pedal security system which can be integrated in pedal modules 1 of different constructions. The pedal security system according to the present invention is, thus, not limited to the pedal module shown in FIG. 1.

The rotatable mounting of the pedal 20 is realized by means of a pedal axis 30. This pedal axis 30 is received in a corresponding opening 40 and it is mounted by a clamp 34 according to the shown preferred embodiment of the pedal module 1. It is preferred according to the invention to mount the different pedals 20 by means of single pedal axis 30. It is also preferred to rotatably mount several pedal axes 30 on a common pedal axis 30. Further, said module block 10 comprises an expandable slot 50 which is connected with said opening 40. Said expandable slot 50 is more detailed described below. Preferably according to the invention, said pedal module 1 comprises a pushing element 60 cooperating with said pedal axis 30. Said pushing element 60 is fixed to a part of the vehicle structure or to a part of the car body of the vehicle which is such displaced in case of an accident that it moves the pushing element 60 in a certain direction. By the movement of said pushing element 60, the pedal axis 30 or several pedal axes 30 are pushed into the respective expandable slot 50. It is also preferred according to the invention to fix said pushing element 60 on a vehicle part not deforming during an accident. In this case, said pedal module 1 executes a movement during an accident so that said pedal axis 30 is pushed in said expandable slot 50 by means of said pushing element 60. Said pushing element 60 has thus the function to transform the deforming movement of the vehicle in case of an accident in a relative movement between the pedal axis 30 and the module block 10 with expandable slot 50 so that said pedal axis 30 is moved in said expandable slot 50. In this manner, the risk of injury of the driver is minimized.

It is further preferred according to the invention to push said pedal axis 30 in said expandable slot 50 by means of electromechanical, pneumatical or pyrotechnical components. Said components are preferably according to the invention triggered by sensors as known in a similar manner for airbags.

In order to optimally realize the above relative movement between said pedal axis 30 and said module block 10 and to optimally adapt said pedal module 1 to all possible vehicle types, said expandable slot 50 can preferably according to the invention be arbitrarily oriented in said pedal block 10. The orientation is preferably according to the invention chosen dependent on the deforming parts of the motor vehicle. Additionally, the movement of the pedal 20 is predetermined for the case of an accident by the orientation of said expandable slot 50.

Based on the pedal security system according to the invention, the following functions are realized to guarantee the security of the driver. On the one hand, it is guaranteed by the present invention that in case of a collision of a motor vehicle the pedals are not moved in the region of the driver. On the other hand, it is assured that the pedal axis 30 on which the pedal 20 is mounted, is not released from the mounting in the module block 10. The construction according to the invention of the present pedal security system, thus, guarantees that the pedal 20 does not exist as freely moveable or as flying parts even in case of an accident and therefore cause injuries of the passengers of the vehicle by their uncontrolled movement. Based on its construction according to the invention, the present pedal security system realizes a selective and defined movement of the pedals out of the driver's region wherein these pedals remain mounted in the module block 10 at the same time.

The pedal 20 for example made of plastic material or metal is rotatably mounted on a pedal axis 30. The pedal axis 30 is also preferably according to the invention made of plastic material of sufficient strength. At its visible end, said pedal axis 30 comprises a projection 32 so that said pedal axis 30 can be suitably mounted in an opening 40 provided therefor. The projection 32 prevents a release of the pedal axis 30 also during the later displacement in said expandable slot 50. Preferably according to the invention, said pedal axis 30 is mounted by means of a clamp 34 arranged between the projection 32 and the module block 10. Preferably according to the invention, said clamp 34 transmits a certain initial tension to the pedal axis 30. In this manner, an additional free motion of the pedal axis 30 and the pedal 20 in its mounting is prevented.

The opening 40 for receiving the pedal axis 30 is connected to an expandable slot 50. Said expandable slot 50 is shown in detail in FIG. 2. From its basic structure, said expandable slot 50 corresponds to an elongated hole. Starting from the longer sides, lateral walls 52 project inwardly which preferably according to the invention at least partly close said expandable slot 50 or said elongated hole. It is also preferred according to the invention that said lateral walls 52 completely close said expandable slot 50.

Without said lateral walls 52 according to the invention, said elongated hole of said expandable slot 50 has a width which corresponds to the diameter of the opening 40 for receiving the pedal axis 30. The preferred identicalness according to the invention in the dimension of the opening 40 and the elongated hole of the expandable slot 50 serves for the later receiving and the displacement of the pedal axis 30 in the expandable slot 50.

According to a preferred embodiment of the present invention, said lateral walls 52 projecting in said expandable slot 50 are moveably configured. Moveably means in this context that said lateral walls 52 can be pushed out of or moved out of said expandable slot 50 by a sufficient high mechanical load. Preferably according to the invention, said moving out of said lateral walls 52 is realized by bending or dismounting said lateral walls 52. To support said bending or dismounting, preferably according to the invention predetermined breaking points or diminution in the thickness of said lateral walls 52 are preferably arranged at the edge of said elongated hole or said expandable slot 50. In case said lateral walls 52 are dismounted or for example bent by an angle of 90° from their initial position, an elongated hole as mentioned above follows wherein its width preferably according to the invention corresponds to the diameter of the opening 40 for receiving said pedal axis 30.

According to a further preferred embodiment of the present invention, said lateral walls 52 are made of metal or non-breaking plastic material so that a bending of these lateral walls 52 is possible without a subsequent dismounting. Based on this preferred inventive choice of the material for manufacture said lateral walls 52, it is guaranteed that for example in case of a collision of the motor vehicle no parts, in this case the lateral walls 52, are released from the pedal module 1 and, thus, can generate injuries of the passengers as freely moveable parts in the passenger compartment of the motor vehicle.

Figure 3A:
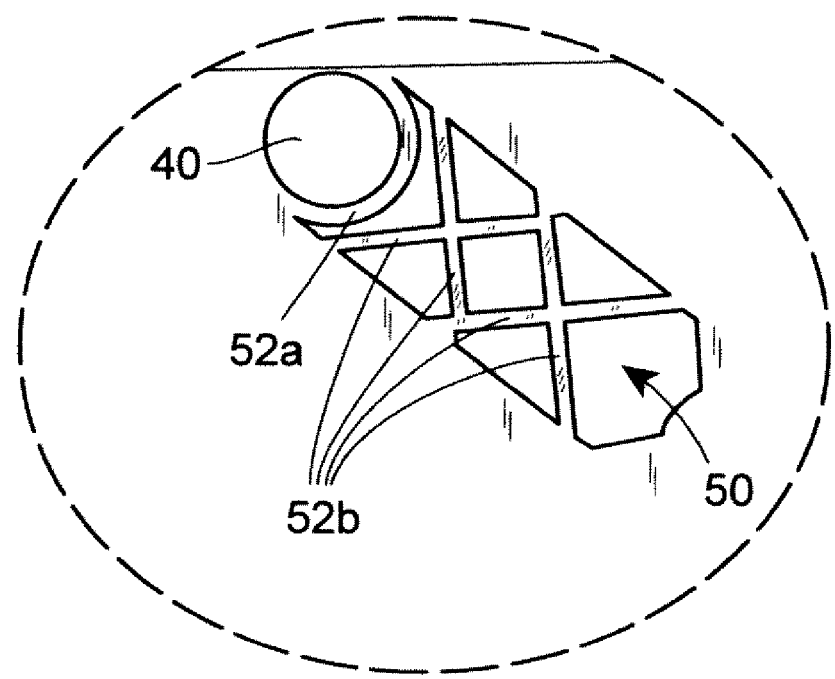
Figure 3B:
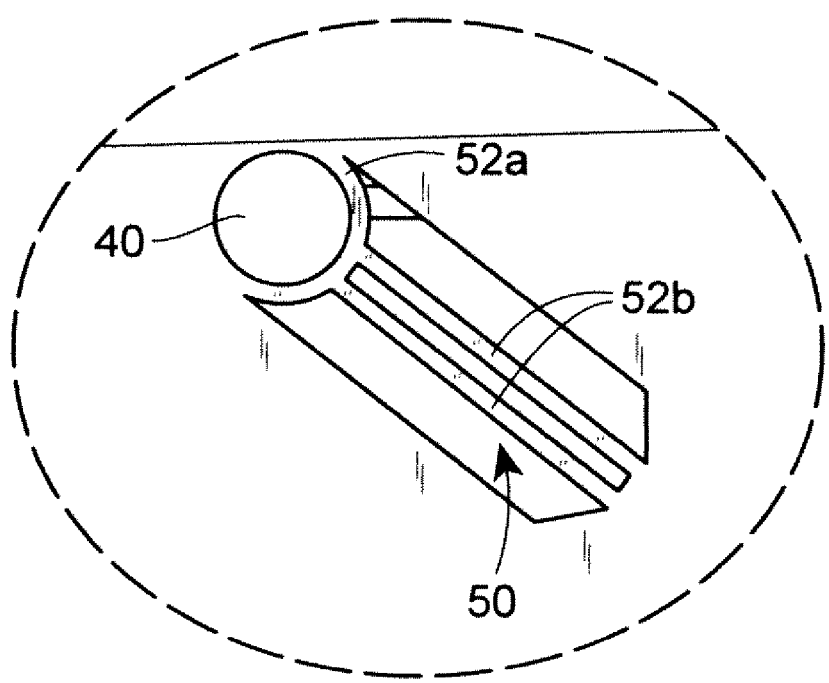

According to a further preferred embodiment, said lateral walls 52 are formed by arbitrary arrangements of ribs or webs. With respect to the mentioned arrangement, it is however important that it sufficiently supports the pedal axis 30 during the normal operation. Only in case of a collision of the motor vehicle, said ribs or webs preferred according to the invention fail and, in this manner, release the pedal axis 30. Preferred examples of the arrangement of said ribs or webs are shown in FIGS. 3A and 3B. Said ribs are preferably X-shaped or they extend longitudinally in said expandable slot 50.

In particular, with reference to FIGS. 3A and 3B, the lateral walls 52 include a first wall 52a that separates the opening 40 from the slot 50. The lateral walls 52 also include second walls 52b disposed in the slot 50. As illustrated in FIG. 3A, the second walls 52b are X-shaped. As illustrated in FIG. 3B, the second walls 52b extend longitudinally in the slot 50.

It is also preferred according to the invention to displaceably arrange said lateral walls 52 in track-like constructions (not shown). Said track-like constructions preferably run approximately perpendicularly to said expandable slot 50 and said lateral walls 52 are biased by a spring. The initial tension of this spring guarantees that said lateral walls 52 at least partly close said expandable slot 50 since it pushes the lateral walls 52 in the inner of said expandable slot 50. Thereby, the pedal axis 30 is retained in the opening 40 under normal conditions. In case of a sufficient mechanical loading of the lateral walls 52 higher than the initial spring tension of the lateral walls 52, said lateral walls 52 are pushed outwardly and release in this manner said expandable slot 50. Said lateral walls 52 remain mounted by this construction in the module block 10 and, thus, prevent a risk of injury by freely moveable parts.

The movement of the pushing element 60 leads to a displacement of the pedal axis 30 along said expandable slot 50. During this displacement of the pedal axis 30, the same is not released from the module block 10. During displacing the pedal axis 30, said clamp 34 preferably according to the invention serves for the fact that even in case of an expansion of the expandable slot 50 over the diameter of said opening 40, a release of the pedal axis 30 out of the module block 10 is prevented.

According to a further preferred embodiment of the present invention, beside the displacement of the pedal axis 30 said pushing element 60 can serve also for a fixing of said pedal axis 30 in the displaced position. This fixing of the pedal axis in its displaced position 30 prevents an unwanted movability of the pedal 20 within the expanded expandable slot 50 which can also lead to injuries of the driver.

The invention claimed is:

1. A pedal security system for pedal mounting, particularly in motor vehicles, comprising:
   a pedal rotatably mounted by means of a pedal axis; and
   a U-shaped pedal block including a leg having defined therein an opening for receiving and retaining the pedal axis, a slot adjacent to the opening, and lateral walls,
   the lateral walls including a first lateral wall that completely separates the opening and the slot and at least a second lateral wall that extends longitudinally within the slot between a first end and a second end and supports the first lateral wall, the pedal axis engaging the first lateral wall and breaking the first lateral wall by exceeding a mechanical limit loading of the pedal axis, whereby the slot receives the pedal axis.

2. The pedal security system of claim 1, wherein a pushing element cooperates with the pedal axis to transmit a load to the pedal axis, thereby forcing the pedal axis into the slot when the load exceeds the mechanical limit loading of the pedal axis.

3. The pedal security system of claim 1, wherein the slot defines a predetermined displacement path of the pedal axis.

4. The pedal security system of claim 3, wherein the slot is formed by an elongated hole.

5. The pedal security system of claim 4, wherein the at least a second wall is bent, dismounted, or pushed away from the slot in response to the mechanical limit loading by the pedal axis.

* * * * *